US012638636B2

(12) United States Patent
Huang et al.

(10) Patent No.: US 12,638,636 B2
(45) Date of Patent: May 26, 2026

(54) ARRAYED WAVEGUIDE GRATING DEVICE AND ARRAYED WAVEGUIDE GRATING SYSTEM USING THE SAME

(71) Applicant: National Kaohsiung University of Science and Technology, Kaohsiung (TW)

(72) Inventors: Ding-Wei Huang, Taipei City (TW); Kuo-Fang Chung, Taipei City (TW); Po-Han Fu, Taipei City (TW); Tien-Tsorng Shih, Kaohsiung (TW)

(73) Assignee: NATIONAL KAOHSIUNG UNIVERSITY OF SCIENCE AND TECHNOLOGY, Kaohsiung (TW)

( * ) Notice: Subject to any disclaimer, the term of this patent is extended or adjusted under 35 U.S.C. 154(b) by 353 days.

(21) Appl. No.: 18/407,832

(22) Filed: Jan. 9, 2024

(65) Prior Publication Data

US 2025/0224559 A1      Jul. 10, 2025

(51) Int. Cl.
*G02B 6/12* (2006.01)

(52) U.S. Cl.
CPC ...... *G02B 6/12033* (2013.01); *G02B 6/12011* (2013.01); *G02B 6/12016* (2013.01); *G02B 6/12019* (2013.01)

(58) Field of Classification Search
CPC ............ G02B 6/12033; G02B 6/12011; G02B 6/12016; G02B 6/12019; G02B 6/12
See application file for complete search history.

(56) References Cited

U.S. PATENT DOCUMENTS

| | | | | |
|---|---|---|---|---|
| 7,680,364 B2 * | 3/2010 | Nilsson | ...................... | H01S 5/12 |
| | | | | 398/1 |
| 8,597,871 B2 * | 12/2013 | McLeod | ............... | G03F 7/2053 |
| | | | | 430/320 |
| 8,693,827 B2 * | 4/2014 | Katayama | ............ | G02B 6/0008 |
| | | | | 385/20 |

* cited by examiner

*Primary Examiner* — Jennifer Doan
(74) *Attorney, Agent, or Firm* — MUNCY, GEISSLER, OLDS & LOWE, P.C.

(57)      ABSTRACT

An arrayed waveguide grating device includes an input unit, a transmission unit, an adjustment unit and an output unit. The input unit includes an input optical fiber, and a first coupler connected to the input optical fiber. The transmission unit includes multiple transmission optical fibers that are connected to the first coupler and arranged side by side in an order from shortest to longest. The adjustment unit includes a red-shift heater and a blue-shift heater, each of which is configured to heat portions of the transmission optical fibers in a respective one of a red-shift adjustment region tapering along a first direction from the longest to the shortest transmission optical fibers and a blue-shift adjustment region tapering along a second direction reverse to the first direction. The output unit includes a second coupler connected to the transmission optical fibers, and multiple output optical fibers connected to the second coupler.

11 Claims, 4 Drawing Sheets

T(R)/T(B)

121

ARRAYED WAVEGUIDE GRATING DEVICE AND ARRAYED WAVEGUIDE GRATING SYSTEM USING THE SAME

FIELD

The disclosure relates to wavelength division multiplexing communication, and more particularly to an arrayed waveguide grating device and an arrayed waveguide grating system using the same.

BACKGROUND

An arrayed waveguide grating (AWG) for a 1×4 coarse wavelength division multiplexing (CWDM) communication system receives an input optical signal that is a multiplex of four to-be-transmitted optical signals having different wavelengths, and performs wavelength division demultiplexing on the input optical signal to generate four output optical signals that respectively correspond to the four to-be-transmitted optical signals. Because of tolerances created during fabrication of the arrayed waveguide grating or changes in ambient temperature, a spectrum of the input optical signal transmitted in the arrayed waveguide grating may be shifted toward a longer wavelength (hereinafter referred to as being red-shifted), or may be shifted toward a shorter wavelength (hereinafter referred to as being blue-shifted). Based on the principle that the refractive index changes with temperature, the red-shift can be eliminated by heating, and the blue-shift can be eliminated by cooling, so that the input optical signal can be properly demultiplexed by the arrayed waveguide grating.

Heating for eliminating red-shift can be easily implemented by controlling current flow through resistive elements. However, it is difficult to implement cooling for eliminating blue-shift. Even if the cooling can be implemented using, for example, a cooling chip, it is difficult for the cooling chip to control a cooling temperature thereof, and the cooling chip would consume a lot of power.

SUMMARY

Therefore, an object of the disclosure is to provide an arrayed waveguide grating device and an arrayed waveguide grating system using the same. A spectrum of an input optical signal transmitted in the arrayed waveguide grating device can be red-shifted and blue-shifted by heating.

According to an aspect of the disclosure, the arrayed waveguide grating device includes an input unit, a transmission unit, an adjustment unit and an output unit. The input unit includes at least one input optical fiber, and a first coupler that is connected to the at least one input optical fiber. The transmission unit includes a plurality of transmission optical fibers that are connected to the first coupler and arranged side by side on a reference plane, where an $(n+1)^{th}$ one of the transmission optical fibers is adjacent to an $n^{th}$ one of the transmission optical fibers, and has a length that is longer than a length of the $n^{th}$ one of the transmission optical fibers by a predetermined length amount, $1 \leq n \leq N-1$, N is a total number of the transmission optical fibers, the reference plane includes a red-shift adjustment region and a blue-shift adjustment region that are triangular, the red-shift adjustment region tapers along a direction from an $N^{th}$ one of the transmission optical fibers to a first one of the transmission optical fibers, and covers a portion of each of the transmission optical fibers, and the blue-shift adjustment region tapers along a direction from the first one of the transmission optical fibers to the $N^{th}$ one of the transmission optical fibers, and covers another portion of each of the transmission optical fibers. The adjustment unit includes a red-shift heater and a blue-shift heater that are disposed over the reference plane, where the red-shift heater overlaps the portions of the transmission optical fibers in the red-shift adjustment region, and is configured to heat the portions of the transmission optical fibers in the red-shift adjustment region, and the blue-shift heater overlaps the portions of the transmission optical fibers in the blue-shift adjustment region, and is configured to heat the portions of the transmission optical fibers in the blue-shift adjustment region. The output unit includes a second coupler that is connected to the transmission optical fibers, and a plurality of output optical fibers that are connected to the second coupler.

According to another aspect of the disclosure, the arrayed waveguide grating system includes the aforesaid arrayed waveguide grating device, a detection device and a control device. The detection device includes an optical source, a detection input optical fiber, a plurality of detection transmission optical fibers and two detection output optical fibers. The optical source is configured to output a detection optical signal. The detection input optical fiber is connected to the optical source and the first coupler of the arrayed waveguide grating device, and is configured to transmit the detection optical signal from the optical source to the first coupler. The detection transmission optical fibers are connected to the first coupler and the second coupler of the arrayed waveguide grating device, and are configured to transmit the detection optical signal from the first coupler to the second coupler. The detection output optical fibers are connected to the second coupler, and are configured to respectively receive two reference optical signals having different wavelengths from the second coupler, where the detection optical signal has a wavelength equal to an average of the wavelengths of the reference optical signals. The control device includes two optical to electrical converters, a differential amplifier and two control converters. The optical to electrical converters are respectively connected to the detection output optical fibers, and are configured to respectively convert the reference optical signals from the detection output optical fibers into two reference signals. The differential amplifier is connected to the optical to electrical converters, and is configured to generate a difference signal based on a difference between the reference signals from the optical to electrical converters. Each of the control converters is connected to the differential amplifier and a respective one of the red-shift heater and the blue-shift heater of the arrayed waveguide grating device, and is configured to generate a respective adjustment signal based on the difference signal from the differential amplifier so as to control the respective one of the red-shift heater and the blue-shift heater.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
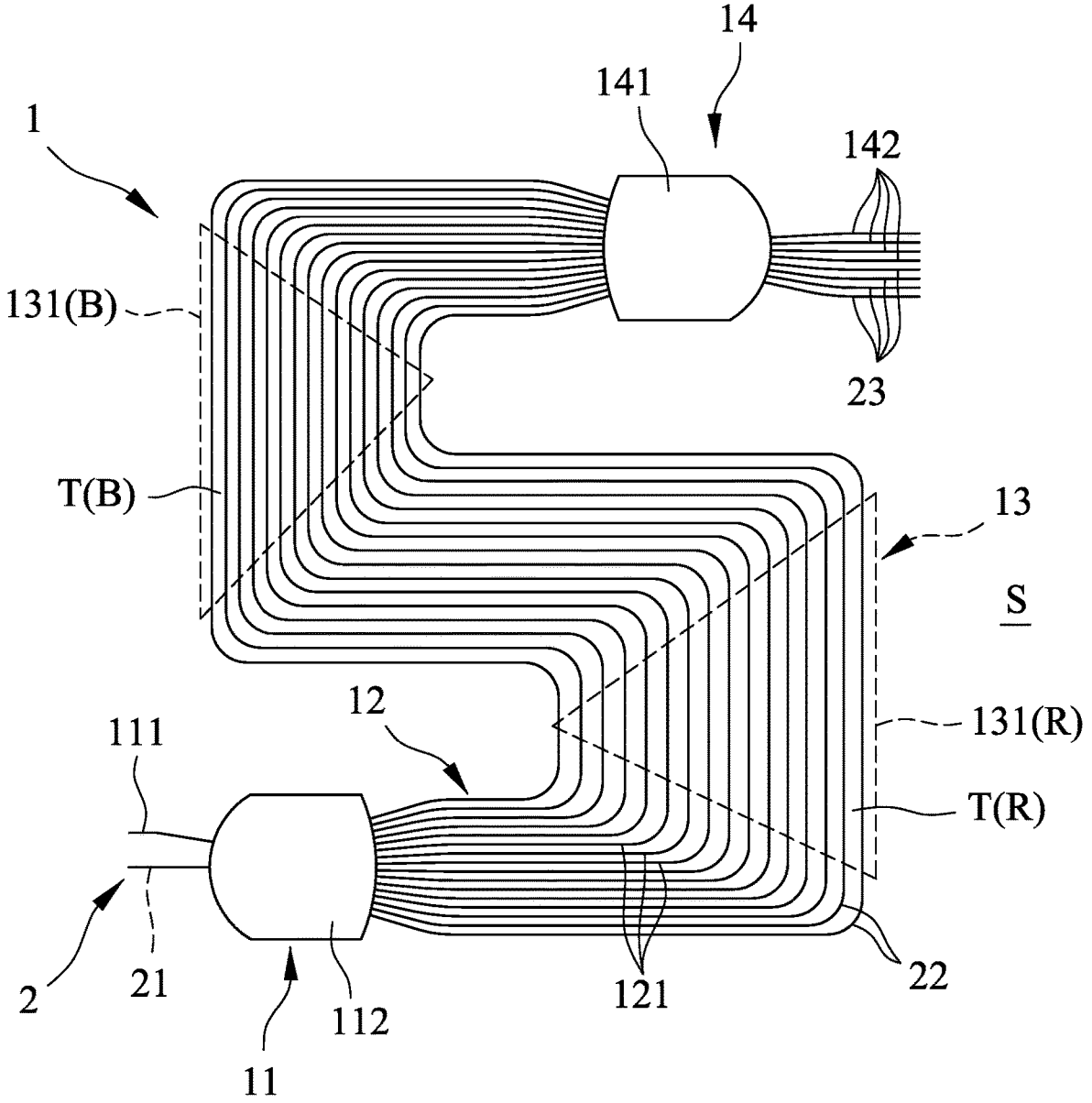
FIG. 1 is a structural diagram illustrating an embodiment of an arrayed waveguide grating device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
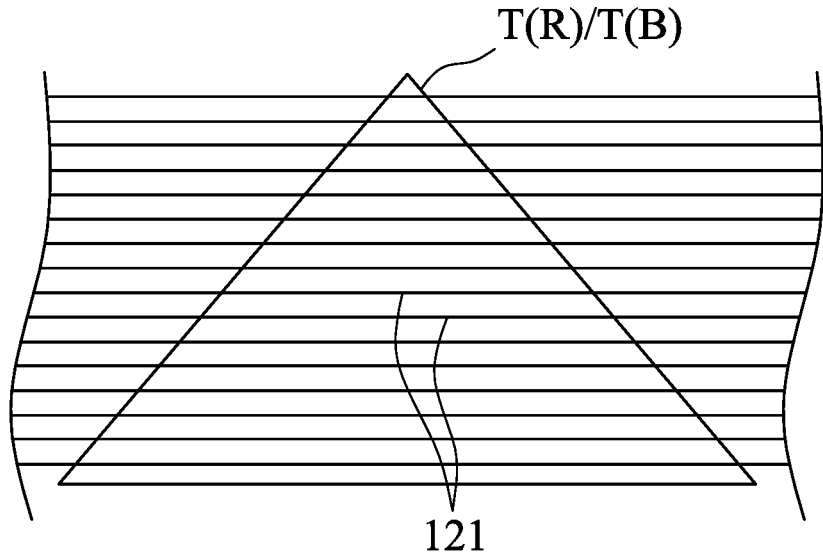
FIG. 2 is a structural diagram illustrating each of a red-shift adjustment region and a blue-shift adjustment region of the embodiment depicted in FIG. 1.

Referring to FIGS. 1 and 2, an embodiment of an arrayed waveguide grating device 1 according to the disclosure includes an input unit 11, a transmission unit 12, an adjustment unit 13 and an output unit 14 that are cascaded.

The input unit 11 includes an input optical fiber 111 and a first coupler 112. An end of the input optical fiber 111 is adapted to be connected to a front end device (not shown) to receive an input optical signal that is a multiplex of multiple to-be-transmitted optical signals having different wavelengths. The first coupler 112 is connected to the other end of the input optical fiber 111. In this embodiment, the first coupler 112 is a star coupler. In addition, the arrayed waveguide grating device 1 is adapted to be used in a 1×4 coarse wavelength division multiplexing (CWDM) communication system, and the input optical signal is a multiplex of four to-be-transmitted optical signals. It should be noted that, in other embodiments, the input unit 11 may include a plurality of input optical fibers 111, and one of the input optical fibers 111 may receive the input optical signal from the front end device.

The transmission unit 12 includes a plurality of transmission optical fibers 121. An end of each of the transmission optical fibers 121 is connected to the first coupler 112. The transmission optical fibers 121 are uniformly arranged side by side and spaced apart from each other on a reference plane (S). An $(n+1)^{th}$ one of the transmission optical fibers 121 is adjacent to an $n^{th}$ one of the transmission optical fibers 121, and has a length that is longer than a length of the $n^{th}$ one of the transmission optical fibers 121 by a predetermined length amount, where $1 \leq n \leq N-1$ and N is a total number of the transmission optical fibers 121. In other words, the transmission optical fibers 121 are arranged side by side in an order from shortest to longest. In this embodiment, each of the transmission optical fibers 121 is formed in an S-shape on the reference plane (S), thereby reducing an area occupied by the transmission optical fibers 121 and facilitating integration of the arrayed waveguide grating device into a small chip package.

The reference plane (S) includes a red-shift adjustment region (T(R)) and a blue-shift adjustment region (T(B)). The red-shift adjustment region (T(R)) and the blue-shift adjustment region (T(B)) are triangular and spaced apart from each other. The red-shift adjustment region (T(R)) tapers along a direction from an $N^{th}$ one of the transmission optical fibers 121 (i.e., the longest transmission optical fiber 121) to a first one of the transmission optical fibers 121 (i.e., the shortest transmission optical fiber 121), and covers a portion of each of the transmission optical fibers 121. The blue-shift adjustment region (T(B)) tapers along a direction from the first one of the transmission optical fibers 121 (i.e., the shortest transmission optical fiber 121) to the $N^{th}$ one of the transmission optical fibers 121 (i.e., the longest transmission optical fiber 121), and covers another portion of each of the transmission optical fibers 121. Therefore, a length of the portion of an $(n+1)^{th}$ one of the transmission optical fibers 121 within the red-shift adjustment region (T(R)) is longer than a length of the portion of an $n^{th}$ one of the transmission optical fibers 121 within the red-shift adjustment region (T(R)), and a length of the portion of the $(n+1)^{th}$ one of the transmission optical fibers 121 within the blue-shift adjustment region (T(B)) is shorter than a length of the portion of the $n^{th}$ one of the transmission optical fibers 121 within the blue-shift adjustment region (T(B)), where $1 \leq n \leq N-1$.

The adjustment unit 13 includes a red-shift heater (RSH) (131(R)) and a blue-shift heater (BSH) (131(B)). The red-shift heater (131(R)) and the blue-shift heater (131(B)) are disposed over the reference plane (S). The red-shift heater (131(R)) overlaps the portions of the transmission optical fibers 121 within the red-shift adjustment region (T(R)), and is configured to heat the portions of the transmission optical fibers 121 within the red-shift adjustment region (T(R)). The blue-shift heater (131(B)) overlaps the portions of the transmission optical fibers 121 within the blue-shift adjustment region (T(B)), and is configured to heat the portions of the transmission optical fibers 121 within the blue-shift adjustment region (T(B)). In this embodiment, each of the red-shift heater (131(R)) and the blue-shift heater (131(B)) is a heating electrode, and the red-shift heater (131(R)) and the blue-shift heater (131(B)) can be easily integrated with a circuit that provides a respective current to each of the red-shift heater (131(R)) and the blue-shift heater (131(B)) so as to cause the heater (131(R)/131(B)) to generate heat via resistance heating.

The output unit 14 includes a second coupler 141, and a plurality of output optical fibers 142 (i.e., four output optical fibers 142 in this embodiment). The second coupler 141 is connected to the other end of each of the transmission optical fibers 121. An end of each of the output optical fibers 142 is connected to the second coupler 141. In this embodiment, the second coupler 141 is a star coupler.

In operation, the input optical signal is transmitted through the input optical fiber 111, the first coupler 112 and the transmission optical fibers 121 to the second coupler 141, and is then converted into four output optical signals that have different wavelengths and that are to be respectively received and transmitted by the output optical fibers 142. The wavelengths of the four output optical signals are respectively equal to the wavelengths of the four to-be-transmitted optical signals. The wavelength of the output optical signal to be received by an $(m+1)^{th}$ one of the output optical fibers 142 is greater than the wavelength of the output optical signal to be received by an $m^{th}$ one of the output optical fibers 142 by a predetermined wavelength amount, where $1 \leq m \leq M-1$ and M is a total number of the output optical fibers 142 (i.e., M=4 and $1 \leq m \leq 3$ in this embodiment). In this embodiment, the predetermined wavelength amount is 20 nm, and the wavelengths of the four output optical signals are respectively 1.27 μm, 1.29 μm, 1.31 μm and 1.33 μm (forming an arithmetic sequence having a common difference of 20 nm).

When blue-shift occurs, the blue-shift heater (131(B)) can be actuated to heat the portions of the transmission optical fibers 121 within the blue-shift adjustment region (T(B)). Since the length of the portion of a longer one of the transmission optical fibers 121 within the blue-shift adjustment region (T(B)) is shorter than the length of the portion of a shorter one of the transmission optical fibers 121 within the blue-shift adjustment region (T(B)), the transmission optical fibers 121 would be heated to different levels (a longer transmission optical fiber 121 would be heated to a smaller level), optical path differences would be generated in the transmission optical fibers 121, and interferences would occur to cause a shift of a spectrum of the input optical signal transmitted in the arrayed waveguide grating device 1 of this embodiment, thereby eliminating the blue-shift.

When red-shift occurs, the red-shift heater (131(R)) can be actuated to heat the portions of the transmission optical fibers 121 within the red-shift adjustment region (T(R)). Since the length of the portion of a longer one of the transmission optical fibers 121 within the red-shift adjustment region (T(R)) is longer than the length of the portion of a shorter one of the transmission optical fibers 121 within the red-shift adjustment region (T(R)), the transmission optical fibers 121 would be heated to different levels (a longer transmission optical fiber 121 would be heated to a greater level), optical path differences would be generated in the transmission optical fibers 121, and interferences would occur to cause the shift of the spectrum of the input optical signal transmitted in the arrayed waveguide grating device 1 of this embodiment, thereby eliminating the red-shift.

Figure 3:
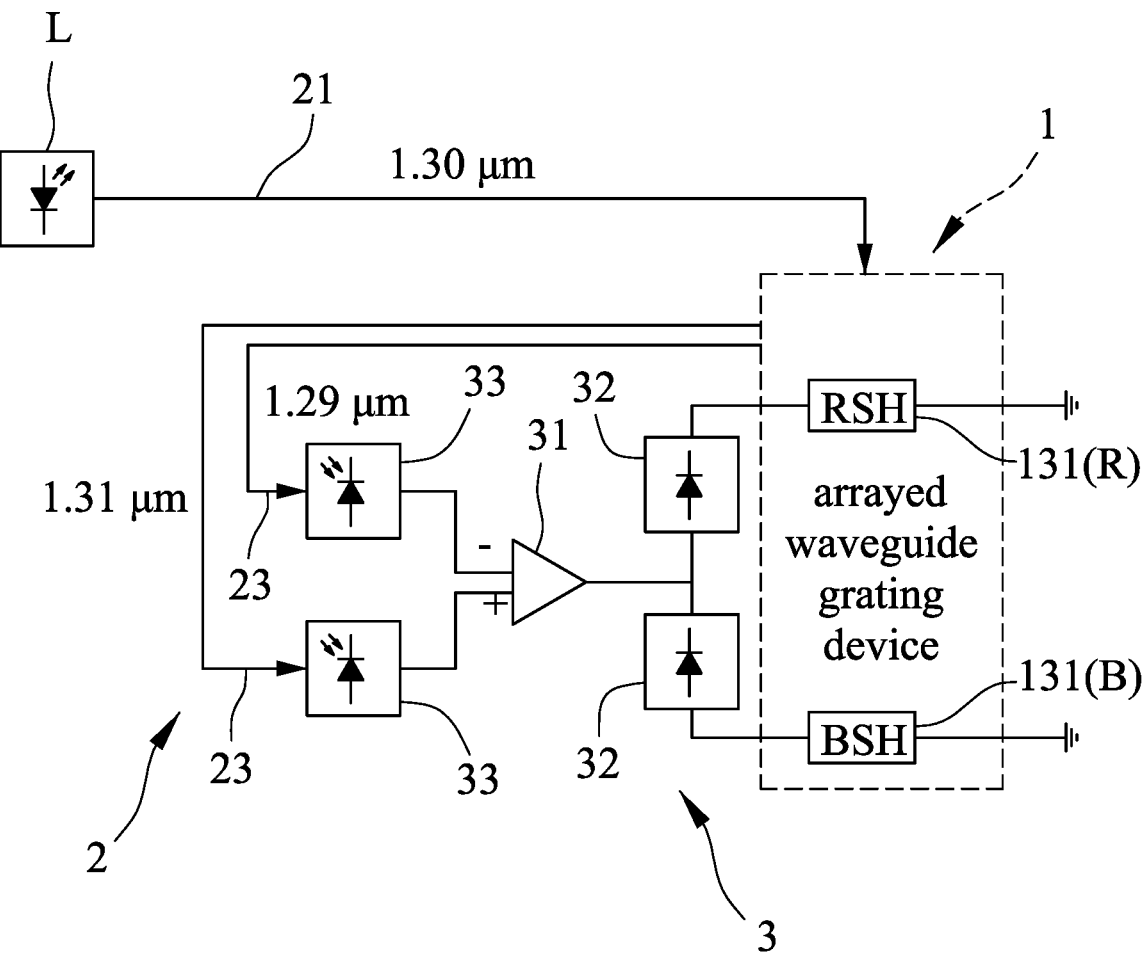
FIG. 3 is a circuit block diagram illustrating an embodiment of an arrayed waveguide grating system according to the disclosure.

Referring to FIGS. 1 and 3, an embodiment of an arrayed waveguide grating system according to the disclosure includes the aforesaid arrayed waveguide grating device 1, a detection device 2 and a control device 3.

The detection device 2 includes an optical source (L), a detection input optical fiber 21, a plurality of detection transmission optical fibers 22 and four detection output optical fibers 23. The optical source (L) is configured to output a detection optical signal having a predetermined wavelength. Two ends of the detection input optical fiber 21 are respectively connected to the optical source (L) and the first coupler 112. Two ends of each of the detection transmission optical fibers 22 are respectively connected to the first coupler 112 and the second coupler 141. The detection transmission optical fibers 22 are uniformly arranged side by side in an order from shortest to longest and spaced apart from each other on the reference plane (S). A portion of each of the detection transmission optical fibers 22 is covered by the red-shift adjustment region (T(R)), overlaps the red-shift heater (131(R)), and can be heated by the red-shift heater (131(R)). A length of the portion of a longer one of the transmission optical fibers 121 within the red-shift adjustment region (T(R)) is longer than a length of the portion of a shorter one of the transmission optical fibers 121 within the red-shift adjustment region (T(R)). Another portion of each of the detection transmission optical fibers 22 is covered by the blue-shift adjustment region (T(B)), overlaps the blue-shift heater (131(B)), and can be heated by the blue-shift heater (131(B)). A length of the portion of a longer one of the transmission optical fibers 121 within the blue-shift adjustment region (T(B)) is shorter than a length of the portion of a shorter one of the transmission optical fibers 121 within the blue-shift adjustment region (T(B)). An end of each of the detection output optical fibers 23 is connected to the second coupler 141. In this embodiment, the optical source (L) is a laser source, and a total number of the transmission optical fibers 121 and the detection transmission optical fibers 22 is sixteen.

In operation, the detection optical signal is transmitted through the detection input optical fiber 21, the first coupler 112 and the detection transmission optical fibers 22 to the second coupler 141, and is then converted into four reference optical signals that have different wavelengths and that are to be respectively received and transmitted by the detection output optical fibers 23. The wavelength of the reference optical signal to be received by a $(p+1)^{th}$ one of the detection output optical fibers 23 is greater than the wavelength of the reference optical signal to be received by a $p^{th}$ one of the detection output optical fibers 23 by the predetermined wavelength amount (i.e., 20 nm), where $1 \leq p \leq P-1$ and P is a total number of the detection output optical fibers 23 (i.e., P=4 and $1 \leq p \leq 3$ in this embodiment). In this embodiment, the wavelength of the detection optical signal is 1.30 μm, and the wavelengths of the four reference optical signals are respectively 1.27 μm, 1.29 μm, 1.31 μm and 1.33 μm (forming an arithmetic sequence having a common difference of 20 nm). The wavelength of the detection optical signal (i.e., 1.30 μm) is an average of the wavelengths of the reference optical signals to be received by the second and third ones of the detection output optical fibers 23 (i.e., an average of 1.29 μm and 1.31 μm).

The control device 3 includes two optical to electrical converters 33, a differential amplifier 31 and two control converters 32. The optical to electrical converters 33 are respectively connected to the other ends of the second and third ones of the detection output optical fibers 23, and are configured to respectively convert the reference optical signals from the second and third ones of the detection output optical fibers 23 (i.e., the reference optical signals having the wavelengths of 1.29 μm and 1.31 μm) into two reference signals. The differential amplifier 31 is connected to the optical to electrical converters 33, and is configured to generate a difference signal based on a difference between the reference signals from the optical to electrical converters 33. The difference signal is correlated to a power difference between the reference optical signals having the wavelengths of 1.29 μm and 1.31 μm. Each of the control converters 32 is connected to the differential amplifier 31 and a respective one of the red-shift heater (131(R)) and the blue-shift heater (131(B)), and is configured to generate a respective adjustment signal based on the difference signal from the differential amplifier 31 so as to control the respective one of the red-shift heater (131(R)) and the blue-shift heater (131(B)). In this embodiment, each of the optical to electrical converters 33 is a photodiode, each of the reference signals is a current signal, the difference signal is a voltage signal, and each of the control converters 32 is a diode.

Figure 4:
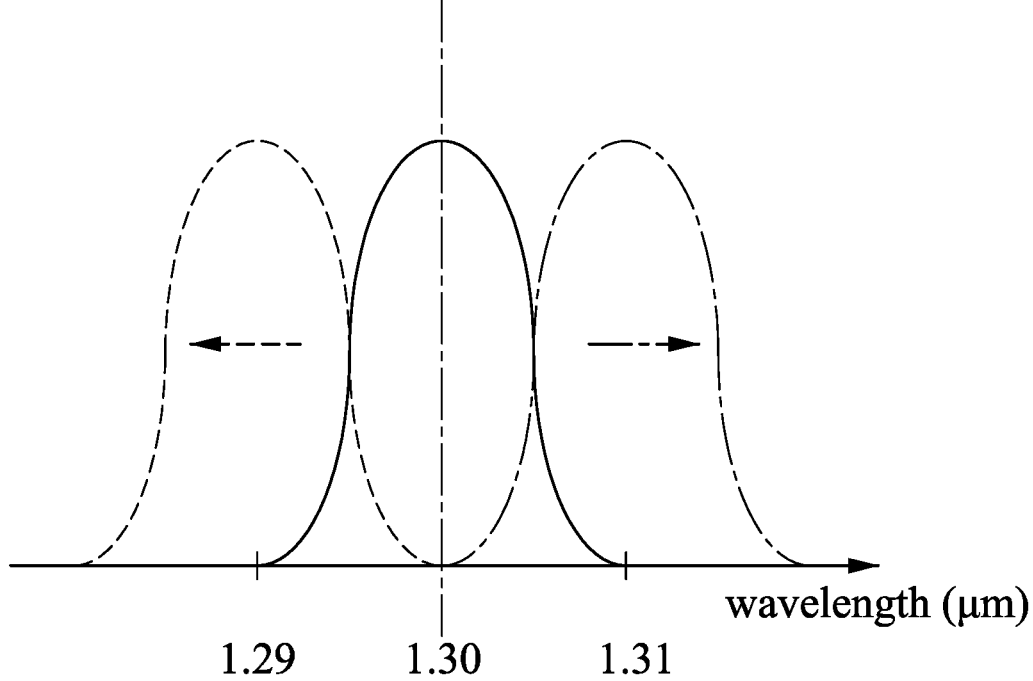
FIG. 4 is a plot illustrating a spectrum of a detection optical signal transmitted in the embodiment depicted in FIG. 3 in various conditions.

Referring to FIGS. 3 and 4, in operation, when the red-shift occurs, power of the reference optical signal having the wavelength of 1.31 μm would be greater than power of the reference optical signal having the wavelength of 1.29 μm, the reference signal that corresponds to the reference optical signal having the wavelength of 1.31 μm would be greater in current magnitude than the reference signal that corresponds to the reference optical signal having the wavelength of 1.29 μm, the difference signal would have a positive voltage magnitude, and the adjustment signal that is generated by the control converter 32 connected to the red-shift heater (131(R)) would actuate the red-shift heater (131(R)) so as to eliminate the red-shift.

In operation, when the blue-shift occurs, the power of the reference optical signal having the wavelength of 1.29 μm would be greater than the power of the reference optical signal having the wavelength of 1.31 μm, the reference signal that corresponds to the reference optical signal having the wavelength of 1.29 μm would be greater in current magnitude than the reference signal that corresponds to the reference optical signal having the wavelength of 1.31 μm, the difference signal would have a negative voltage magnitude, and the adjustment signal that is generated by the control converter 32 connected to the blue-shift heater (131(B)) would actuate the blue-shift heater (131(B)) so as to eliminate the blue-shift.

It should be noted that the optical source (L) and the control device 3 work continuously, so the red-shift and the blue-shift that may occur in the arrayed waveguide grating system of this embodiment will be eliminated eventually.

Referring back to FIG. 1, in view of the above, in the embodiment of the arrayed waveguide grating device 1, since the red-shift heater (131(R)) is configured to heat a longer transmission optical fiber 121 to a greater level, and since the blue-shift heater (131(B)) is configured to heat a longer transmission optical fiber 121 to a smaller level, the red-shift can be eliminated by actuating the red-shift heater (131(R)), and the blue-shift can be eliminated by actuating the blue-shift heater (131(B)).

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An arrayed waveguide grating device comprising:
an input unit including at least one input optical fiber, and a first coupler that is connected to said at least one input optical fiber;
a transmission unit including a plurality of transmission optical fibers that are connected to said first coupler and arranged side by side on a reference plane, where an $(n+1)^{th}$ one of said transmission optical fibers is adjacent to an $n^{th}$ one of said transmission optical fibers, and has a length that is longer than a length of said $n^{th}$ one of said transmission optical fibers by a predetermined length amount, $1 \leq n \leq N-1$, N is a total number of said transmission optical fibers, the reference plane includes a red-shift adjustment region and a blue-shift adjustment region that are triangular, the red-shift adjustment region tapers along a direction from an $N^{th}$ one of said transmission optical fibers to a first one of said transmission optical fibers, and covers a portion of each of said transmission optical fibers, and the blue-shift adjustment region tapers along a direction from said first one of said transmission optical fibers to said $N^{th}$ one of said transmission optical fibers, and covers another portion of each of said transmission optical fibers;
an adjustment unit including a red-shift heater and a blue-shift heater that are disposed over the reference plane, where said red-shift heater overlaps said portions of said transmission optical fibers in the red-shift adjustment region, and is configured to heat said portions of said transmission optical fibers in the red-shift adjustment region, and said blue-shift heater overlaps said portions of said transmission optical fibers in the blue-shift adjustment region, and is configured to heat said portions of said transmission optical fibers in the blue-shift adjustment region; and
an output unit including a second coupler that is connected to said transmission optical fibers, and a plurality of output optical fibers that are connected to said second coupler.

2. The arrayed waveguide grating device as claimed in claim 1, wherein each of said transmission optical fibers is formed in an S-shape on the reference plane.

3. The arrayed waveguide grating device as claimed in claim 1, wherein each of said red-shift heater and said blue-shift heater is a heating electrode.

4. The arrayed waveguide grating device as claimed in claim 1, wherein each of said first coupler and said second coupler is a star coupler.

5. The arrayed waveguide grating device as claimed in claim 1, wherein a total number of said output optical fibers is four times a total number of said at least one input optical fiber.

6. An arrayed waveguide grating system comprising:
an arrayed waveguide grating device according to claim 1;
a detection device including
an optical source configured to output a detection optical signal,
a detection input optical fiber connected to said optical source and said first coupler of said arrayed waveguide grating device, and configured to transmit the detection optical signal from said optical source to said first coupler,
a plurality of detection transmission optical fibers connected to said first coupler and said second coupler of said arrayed waveguide grating device, and configured to transmit the detection optical signal from said first coupler to said second coupler, and
two detection output optical fibers connected to said second coupler, and configured to respectively receive two reference optical signals having different wavelengths from said second coupler, where the detection optical signal has a wavelength equal to an average of the wavelengths of the reference optical signals; and a control device including two optical to electrical converters respectively connected to said detection output optical fibers, and configured to respectively convert the reference optical signals from said detection output optical fibers into two reference signals, a differential amplifier connected to said optical to electrical converters, and configured to generate a difference signal based on a difference between the reference signals from said optical to electrical converters, and two control converters, each of which is connected to said differential amplifier and a respective one of said red-shift heater and said blue-shift heater of said arrayed waveguide grating device, and is configured to generate a respective adjustment signal based on the difference signal from said differential amplifier so as to control the respective one of said red-shift heater and said blue-shift heater.

7. The arrayed waveguide grating system as claimed in claim 6, wherein each of said control converters is a diode.

8. The arrayed waveguide grating system as claimed in claim 6, wherein:

said output optical fibers of said arrayed waveguide grating device are configured to respectively receive a plurality of output optical signals having different wavelengths from said second coupler;

the wavelength of the output optical signal received by an $(m+1)^{th}$ one of said output optical fibers is greater than the wavelength of the output optical signal received by an $m^{th}$ one of said output optical fibers by a predetermined wavelength amount, where $1 \leq m \leq M-1$, and M is a total number of said output optical fibers; and a difference between the wavelengths of the reference optical signals is equal to the predetermined wavelength amount.

9. The arrayed waveguide grating system as claimed in claim 8, wherein the predetermined wavelength amount is 20 nm.

10. The arrayed waveguide grating system as claimed in claim 6, wherein said optical source is a laser source.

11. The arrayed waveguide grating system as claimed in claim 6, wherein each of said optical to electrical converters is a photodiode.

*     *     *     *     *